US010764271B2

(12) United States Patent
Byszio et al.

(10) Patent No.: US 10,764,271 B2
(45) Date of Patent: Sep. 1, 2020

(54) SYSTEMS AND METHODS FOR PERFORMING DISTURBED AUTHENTICATION USING A BRIDGE COMPUTER SYSTEM

(71) Applicant: Bundesdruckerei GmbH, Berlin (DE)

(72) Inventors: Frank Byszio, Wandlitz (DE); Kim Nguyen, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 196 days.

(21) Appl. No.: 15/300,838

(22) PCT Filed: Feb. 10, 2015

(86) PCT No.: PCT/EP2015/052714
§ 371 (c)(1),
(2) Date: Sep. 30, 2016

(87) PCT Pub. No.: WO2015/149976
PCT Pub. Date: Oct. 8, 2015

(65) Prior Publication Data
US 2017/0171189 A1 Jun. 15, 2017

(30) Foreign Application Priority Data
Apr. 2, 2014 (DE) .......... 10 2014 206 325

(51) Int. Cl.
*H04L 29/06* (2006.01)

(52) U.S. Cl.
CPC ........ *H04L 63/0815* (2013.01); *H04L 63/083* (2013.01); *H04L 63/0853* (2013.01);
(Continued)

(58) Field of Classification Search
CPC ......... G06F 21/62; H04L 12/66; H04L 61/20; H04L 63/04; H04L 69/16
See application file for complete search history.

(56) References Cited

U.S. PATENT DOCUMENTS

| 6,883,095 B2 * | 4/2005 | Sandhu ................... G06F 21/46 713/168 |
| 8,359,389 B1 | 1/2013 | Cohen et al. |

(Continued)

FOREIGN PATENT DOCUMENTS

| WO | WO-2009/016580 A2 | 2/2009 |
| WO | WO-2011/006791 A1 | 1/2011 |

OTHER PUBLICATIONS

International Search Report PCT/ISA/210 for International Application No. PCT/EP2015/052714 dated Apr. 15, 2015.
(Continued)

*Primary Examiner* — Wasika Nipa
(74) *Attorney, Agent, or Firm* — Harness, Dickey & Pierce, P.L.C.

(57) ABSTRACT

A system includes a first computer system (FCS) configured to receive an authentication request of a user with respect to the first authentication system (FAS), and communicate an unsuccessful authentication attempt. In response, a bridge computer system (BCS), is configured to request a user ID and receive at least the user ID; identify an address of a second computer system (SCS) based on of the user ID; and initiate the second authentication system (SAS) using the address. The SCS, if the user has been successfully authenticated with respect to the SAS, is configured to communicate successful authentication to the BCS; and in response, the BCS is configured to send the FAS a confirmation message, and the FCS is configured to treat the user as authenticated.

19 Claims, 5 Drawing Sheets

Figure 1A:
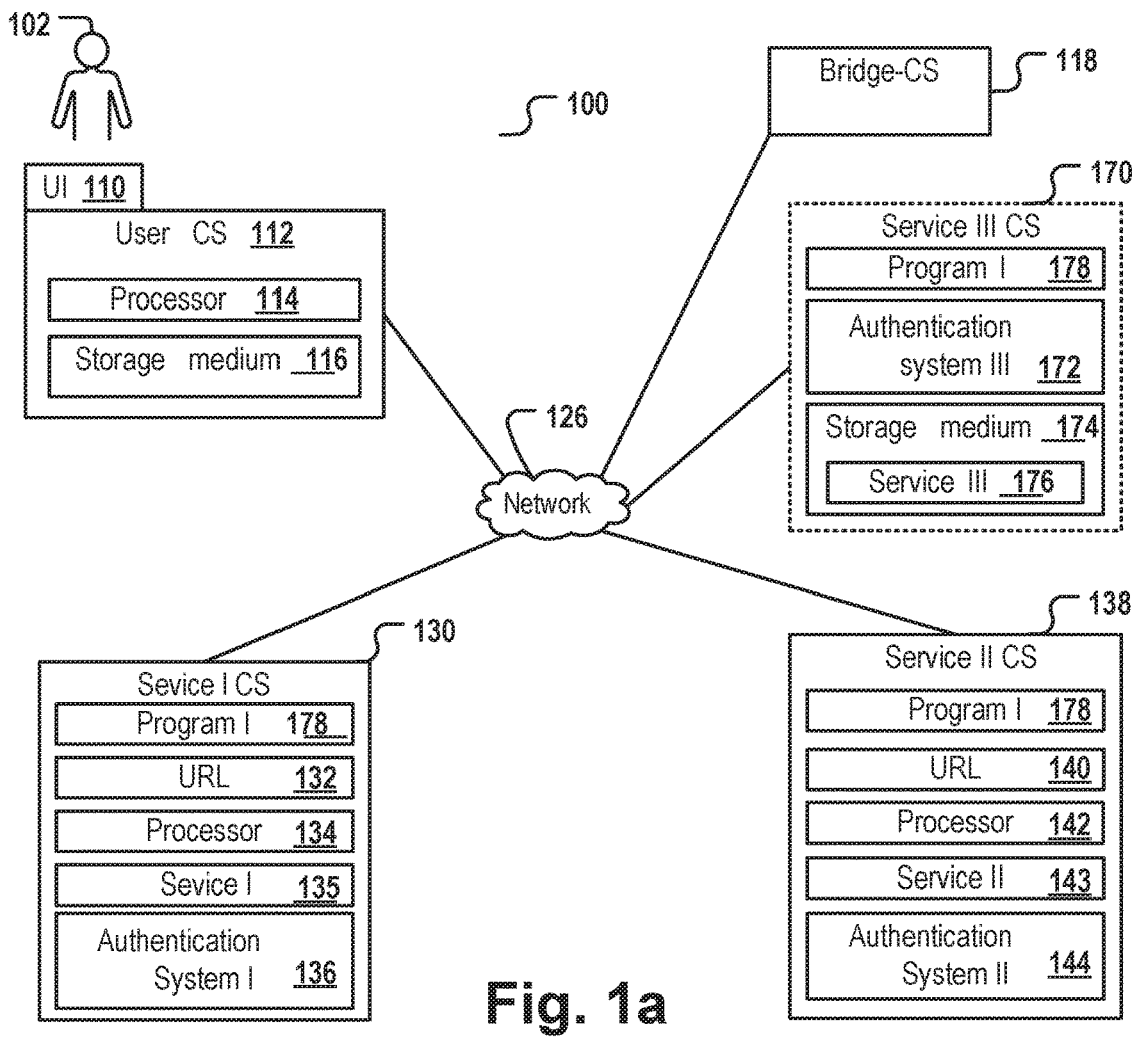

(52) U.S. Cl.
CPC ...... *H04L 63/0861* (2013.01); *H04L 63/0876* (2013.01); *H04L 63/101* (2013.01)

(56) References Cited

U.S. PATENT DOCUMENTS

| | | | |
|---|---|---|---|
| 8,505,085 B2* | 8/2013 | Logan | G06F 21/33 |
| | | | 726/9 |
| 2003/0163737 A1 | 8/2003 | Roskind | |
| 2007/0169181 A1 | 7/2007 | Roskind | |
| 2009/0199276 A1* | 8/2009 | Schneider | H04L 63/0815 |
| | | | 726/5 |
| 2010/0251347 A1 | 9/2010 | Roskind | |
| 2011/0023103 A1* | 1/2011 | Dietrich | G06F 21/31 |
| | | | 726/9 |
| 2012/0144464 A1* | 6/2012 | Fakhrai | G06F 21/41 |
| | | | 726/6 |
| 2015/0082400 A1 | 3/2015 | Fakhrai et al. | |
| 2015/0308856 A1 | 10/2015 | Srinivasan et al. | |

OTHER PUBLICATIONS

Written Opinion of the International Searching Authority PCT/ISA/237 for International Application No. PCT/EP2015/052714 dated Apr. 15, 2015.

* cited by examiner

SYSTEMS AND METHODS FOR PERFORMING DISTURBED AUTHENTICATION USING A BRIDGE COMPUTER SYSTEM

CROSS-REFERENCE TO RELATED APPLICATIONS

This application is the U.S. National Phase application of PCT Application No. PCT/EP2015/052714 filed on Feb. 10, 2015, which claims priority to German Patent Application No. 102014206325.6 filed on Apr. 2, 2014, the entire contents of each of which are incorporated herein by reference.

The invention relates to a distributed authentication system, a bridge computer system, a computer system that provide a service and an authentication system, and corresponding computer-implemented processes executed by the respective systems.

Multiple services of a large number of service providers that are independent of one another are made available over the Internet. The services are, e.g., online shops, bank services, news portals with special information and service offerings for subscribers, customer portals of companies, collaboration platforms for online teamwork, and similar things. Software programs, storage space, and computing capacity are also increasingly being offered as a service, e.g., as a cloud service.

Paid services or services that should grant only a certain circle of users access to confidential data require that users authenticate themselves to the service.

As a rule, the customer can choose from among multiple organizationally separate service providers that compete with one another, each of which provides its own authentication system. As a rule, the user must, for every service that he wants to use, first register, and during the registration process he receives service-specific and also user-specific authentication data. In addition, the authentication systems of different service providers often also differ with respect to the technical authentication process and its security level. For instance, different service providers have different requirements regarding the length and composition of passwords or the type of authentication data (password, biometric data, etc.).

The large number of services and service providers, each of which provides its own authentication system for its services, increasingly confronts users with the problem of keeping a large amount of sensitive authentication data secure, but nevertheless having it quickly available.

So-called "single sign-on" processes allow a user to access, after a single authentication on a workstation, all computers and services to which he is locally entitled (authorized), and to do so through the same computer, without having to log on again every time. However, these processes assume that the computers and services belong to the same "trusting domain", that is, the computers typically all belong to a certain organizational unit, for instance a company, a department, or a workgroup. However, this assumption is not met by services provided over the Internet by different providers, since as a rule they come from independent companies which often are even competitors, and they themselves want to have, and also maintain, exclusive control over their respective authentication systems.

Password manager programs are helpful in managing passwords. However, they are limited to password-based authentication systems and are, as a rule, unsuitable for managing other authentication data such as biometric data, for instance. Moreover, they are stored on a computer that often is not available just when a certain password is required for a service. A user who wants to book a ticket for a business trip from his private computer at home might have stored the access data required for the online ticket purchase on his work computer at the office, so that the online ticket purchase from his home computer will fail.

Storing passwords on mobile devices such as smartphones, for instance, also is not a satisfactory solution, since a mobile device can be unavailable, e.g., because it has been forgotten or because its battery is weak, and/or since the increased danger of losing the mobile device also increases the risk of losing the passwords stored on this device.

That is, in practice it frequently happens that users are denied services since they have forgotten the password or since the stored passwords, security tokens, or other proofs of identity are, at least at the moment, unavailable for other reasons.

An "ID token" is a portable electronic device such as, for example, a USB stick, or a document, in particular a value document or a security document, e.g. in the form of a chip card. An ID token is associated with a user and comprises a processor and a storage medium for secure storage of data, e.g., personal attributes or private keys. A "document" can be a paper-based and/or plastic-based document. Examples include identity documents, especially passports, identity cards, visas, and driver's licenses, vehicle certificates of registration, vehicle titles, company IDs, health insurance cards, or other ID documents and also chip cards, bank cards, and credit cards, waybills, or other proofs of authorization that have a data storage device and processor integrated into them.

Here a "certificate" is understood to be a digital certificate, which is also designated as a public key certificate. A certificate is structured data that is used to associate a public key of an asymmetric cryptosystem with an identity, such as, for example, a person or a device. For example, the certificate can conform to the standard X.509 or another standard.

An "authentication system" is a data processing system that is able to determine, on the basis of data that a user provides during authentication attempts (so-called "authentication data"), whether this user is the user that had originally registered using this authentication system. This determination is made automatically by a decision algorithm of the authentication system. The degree of certainty of the aforementioned determination depends on the technical and organizational security measures of the authentication system. The degree of reliability of the correctness of this determination is expressed using a unit of measurement that will be referred to below as 'security level. An authentication system can consist of a data processing device, e.g., a computer, or of multiple data processing devices working together.

In the context of this invention, an "authentication system" is distinguished from every other "authentication system", conceptually and in terms of security technology, by the fact that the ultimate sovereignty over the decision about the registration process and about the decision algorithm of this authentication system lies exclusively in the hands of the operator of this authentication system, not in the hands of the operators of other authentication systems. To the extent that certain parts of the function of an authentication process are delegated to third parties, this delegation is also subject to the decision of the operator of the aforementioned authentication system.

Authentication of an entity A with respect to an authentication system B involves A sending a data value to prove a claimed property, e.g., identity, to B, and B checking this data value, and if the data value is considered credible proof of the claimed property, B recognizing the entity A as authorized. In this case, A has successfully authenticated itself with respect to B.

A "distributed authentication system" is a system in which two or more individual authentication systems according to the above definition are functionally connected together. According to the invention, the functional connection can, in particular, consist of one of the individual authentication systems functioning as an alternative fallback authentication system for another individual authentication system.

Below a "service" is understood to mean any electronic service offered over a network, e.g., the Internet, which is not aimed at confirming the identity of a user. In particular, a "service" can comprise one of the following applications: an online-bank service, a web application made available by the authorities for data communication with the authorities (e.g., for the purpose of filing a tax return), an online shop, a social network, a web-based collaboration platform a cloud service, a car sharing portal, an access-protected news or information portal, etc. A computer system that provides such a service will also be referred to below as a "service computer system".

An "eID provider computer system" is a data processing system which can automatically confirm or deny the identity of a user with respect to third parties. An "eID provider computer system" is preferably located in an especially protected environment, in particular in a so-called trust center, so that confirmation of the identity of a user by an eID provider computer system has an especially high reliability.

A "bridge computer system" is a data processing system that sets up a functional connection between a computer system that provides a service, and at least one other computer system. The other computer system can, according to embodiments of the invention, be another computer system that provides another service, or an eID provider computer system.

A "register" is a data container, e.g., a file or a relational database, which stores multiple user IDs linked with other data values.

A "user ID" is an identifier of a user that is unique for a certain user, at least with respect to all user IDs stored in the register of a bridge computer system.

Two alternative variants I, II of an inventive distributed authentication system are presented below.

Variant I: Distributed Authentication System Based on at Least Two Service Computer Systems One aspect of the invention relates to a distributed authentication system that comprises at least a first computer system and a second computer system and a bridge computer system.

The first computer system provides, over a network, a first authentication system that allows one or more users to be authenticated with respect to this first authentication system. Moreover, the first computer system provides a first service to the one or more users over the network, assuming that these users have successfully authenticated themselves with respect to the first authentication system.

The second computer system provides, over the network, a second authentication system that allows one or more users to be authenticated with respect to this second authentication system. Moreover, the second computer system provides a second service to the one or more users over the network, assuming that these users have successfully authenticated themselves with respect to the second authentication system.

The bridge computer system is connected over the network with the first and second computer systems.

The first authentication system is designed to receive an authentication request of a user with respect to the first authentication system. The first authentication system comprises an interface to receive the authentication request of a user computer system that is associated with the user. Sending the authentication request from the user computer system to the first authentication system should be considered to be an authentication attempt.

If the user's authentication attempt with respect to the first authentication system is unsuccessful, the first authentication system communicates this unsuccessful authentication attempt to the bridge computer system by means of a first message.

If the bridge computer system receives the first message, it sends the user computer system a request to input at least a user ID, and receives in response to this request the user ID of the user computer system. The bridge computer system contains a register which also associates, with the user that initiated the unsuccessful authentication attempt, multiple computer systems (130, 138) that provide a service to the user after each successful authentication. The register associates at least the first and second computer system with this user. After receiving the first message, the bridge computer system identifies an address, stored in the register, of the second computer system on the basis of the received user ID, and initiates the execution of the second authentication system to authenticate the user with respect to the second authentication system. To initiate the second authentication system, the bridge computer system uses the identified address.

If the user has successfully authenticated himself with respect to the second authentication system that has been initiated, the second authentication system communicates this successful authentication to the bridge computer system by means of a second message.

If the bridge computer system receives the second message, it communicates an identity confirmation message regarding the user to the first computer system. If the first authentication system receives the identity confirmation message, it treats the user as successfully authenticated, and then provides this first service to him.

An advantage of the aforementioned distributed authentication system is that user side storage and management of different authentication data for many authentication systems or service providers, which always involves a security risk, is no longer necessary: for example, if the user should, for any reason, temporarily or permanently no longer have available the authentication data for the first authentication system, but still has at least the authentication data for the second service (which he does not really want to use at the moment), then the distributed authentication system, in particular the bridge computer system, allows the user to authenticate himself with respect to this second computer system, and a successful authentication process with respect to the second authentication system serves as proof of the user's trustworthiness. This increases the security, since the user no longer has to keep a large amount of sensitive authentication data with him.

In another advantageous aspect, the previously mentioned system avoids the possibly substantial effort (for the user as well as for the service provider), that is connected with a manual/personal reregistration or reassignment of authentication data.

Another advantageous aspect of the previously mentioned system is that it can be considered and used as a modified "single sign-on" system, which can also, in contrast to previously known "single sign-on" systems, be used in a technical context, in which the owners of the various computer systems/authentication systems still want to maintain full control over their respective authentication systems and do not, for this reason, relinquish the responsibility to a central registration service. The first and second authentication systems can still be operated independently by different organizations and groups. They have the capability to exclude individual users from using their services at any time, for example because of inappropriate behavior or non-fulfillment of a contract, by refusing an authentication with respect to their respective authentication systems. Cooperation between the individual service providers is only necessary inasmuch as they must trust that the security standards of the alternatively used authentication systems are sufficient to trust the authenticity of the (identity) data sent by the user. However, as a rule these might be higher than the classic e-mail-based reset mechanisms. Thus, the previously mentioned distributed authentication system makes it possible to provide a "modified single sign-on system" in a technical and organizational context that made it impossible to use the previously known "single sign-on" systems.

According to embodiments, the first message contains an address of the user computer system or other information regarding the user computer system, which allows the bridge computer system to send the user computer system a request to input at least a user ID. The address can be, for example an IP address of the user computer system, an e-mail address of the user, and/or a session ID of an existing session between the user computer system and the first computer system. Preferably, the first message contains all data that is necessary to set up, between the bridge computer system and the user computer system, a protected connection to transfer the user ID from the user computer system to the bridge computer system, for example data from which session keys can be derived.

According to embodiments, the register of the bridge computer system does not contain any authentication data. Preferably, it only contains user IDs, which are stored linked with addresses of computer systems with respect to which the user has already registered (which implies that the user should be able to authenticate himself with respect to these computer systems or these authentication systems), so that the corresponding computer systems/authentication systems can serve as alternative "fallback authentication systems" (that is, in order to act as the "second computer system", according to the above terminology). The second or alternative authentication system allows the user to authenticate himself with respect to the second authentication system, and thus ultimately also with respect to the first authentication system, even if the authentication data of the first authentication system is not available to him. That is, the first computer system provides the first service that the user really wants to use, while the second computer system or the third, fourth, or some other computer system, is only used as an alternative authentication system. Using the second, third, and some other services provided by the second computer system or the third, fourth, or some other computer system is not required or provided according to the invention, but can, in individual embodiments, be possible in addition to using the first service. A large number of integrated second, third, and other computer systems is advantageous, since this increases the fault-tolerance: if the second computer system should not, for example due to technical problems, be available to provide an alternative authentication system, the bridge computer system can fall back on the third or other computer system or authentication system. This can happen, for example, if the bridge computer system still has not, by a certain minimum time after initiation of the second authentication system, received any second message from the second authentication system, or has received an unavailable message. Moreover, it increases the probability that the user can successfully authenticate himself with respect to at least one of multiple authentication systems, since it is unlikely that the user would forget all authentication data for all service providers at the same time.

According to embodiments, the distributed authentication system additionally comprises at least a third computer system. The third computer system makes a third authentication system available over the network. The third authentication system allows one or more users to authenticate themselves with respect to the third authentication system. Moreover, the third computer system provides a third service over the network to the one or more users, assuming that these users have successfully authenticated themselves with respect to the third authentication system. Optionally, the distributed authentication system can also contain fourth, fifth, and other computer systems, each of which provides its own authentication system in the previously described manner and also provides corresponding services after corresponding authentication with respect to its respective own authentication system. The user has registered a single time with respect to each of the service providers that provide these computer systems or authentication systems and services, and the register of the bridge computer system stores a linkage between the user ID of this user and an address of the respective computer systems with respect to which the user has registered.

The second computer system provides, over the network, a second authentication system that allows one or more users to be authenticated with respect to this second authentication system. Moreover, the second computer system provides a second service over the network to the one or more users, assuming that these users have successfully authenticated themselves with respect to the second authentication system.

Another aspect of the invention relates to a bridge computer system with a network interface to connect, over a network, the bridge computer system with one or more user computer systems, each of which is associated with a user, and to connect at least with a first and with a second computer system. As has already been described above, the first computer system is designed to provide a first authentication system and a first service to one or more users over the network. The second computer system is designed to provide a second authentication system and a second service to one or more users over the network The first and second services are each provided only after successful authentication with respect to the respective authentication system. The bridge computer system comprises the register according to one of the previously described embodiments.

The network interface is designed to receive a first message from the first computer system, the receipt of the first message indicating an unsuccessful authentication attempt by one of the users with respect to the first computer system. If the first message is received, the bridge computer system sends a request to the user computer system to input at least a user ID; receives at least the user ID from the user computer system; identifies, on the basis of the received user ID, an address of the second computer system stored in the register; and initiates the execution of the second authentication system to authenticate the user. The initiation is done using the identified address.

The network interface of the bridge computer system is designed to receive a second message from the second computer system, receipt of the second message indicating successful authentication of the user with respect to the second authentication system. If the second message is received, the bridge computer system communicates an identity confirmation message regarding the user to the first authentication system to have the first computer system treat the user as successfully authenticated, and to provide the first service to him.

Another aspect of the invention relates to a computer-implemented process to authenticate a user with respect to a first authentication system. The process comprises:

Sending an authentication request of the user from a user computer system associated with the user to the first authentication system, which is provided by a first computer system. Moreover, the first computer system provides, over a network, a first service to one or more users that have been successfully authenticated through the first authentication system;

Receiving, by the first computer system, the authentication request;

If the user authentication attempt with respect to the first authentication system by means of the authentication request is unsuccessful, sending a first message from the first computer system to a bridge computer system;

Receiving the first message by the bridge computer system, which contains a register. The register associates the user with multiple computer systems, each of which provides a service to the user after successful authentication. The multiple associated computer systems comprise at least the first computer system and a second one. The second computer system provides a second authentication system, the second computer system providing, over the network, a second service to one or more users that have been successfully authenticated through the second authentication system;

In response to receiving the first message, sending a request, from the bridge computer system to the user computer system, to input a user ID associated with the user, to receive from the user computer system at least the user ID;

Identifying an address of the second computer system, this address being stored in the register, on the basis of the user ID received by the bridge computer system;

Initiating execution of the second authentication system using the identified address for authentication of the user;

Sending a second message from the second computer system to the bridge computer system, if the user has, during execution of the second authentication system, successfully authenticated himself with respect to the second authentication system;

In response to receiving the second message, sending, from the bridge computer system to the first authentication system, an identity confirmation message regarding the user;

In response to receiving the identity confirmation message, treating, by the first computer system, the user as successfully authenticated and providing the first service to the authenticated user.

According to embodiments, the bridge computer system has a prioritization module. The prioritization module selects, from the multiple computer systems in the register that are associated with the user through his user ID, the computer system that meets a condition, in order to use this computer system as the second computer system. The condition can be that the computer system to be selected is the one among the multiple computer systems that has the lowest processor utilization. Alternatively, the condition can be that the processor utilization of the computer system to be selected lies below a threshold. Each of the multiple computer systems stored in the register can be assigned a security level that indicates the level of the requirements on a user for authentication with respect to the authentication system of the respective computer system. Alternatively, the condition can also be that the authentication system of the computer system to be selected is the one that has the highest security level (e.g., compared with the authentication system of another second, third, or other computer system that is also associated with the user ID of the user), or that the authentication system of the computer system to be selected has a security level above a threshold.

Alternatively, the condition can also be that a user-editable configuration file has prioritized the computer system to be selected. Combinations of conditions are also possible, for instance, a combination in which the computer system to be selected both must have a certain minimum security level, and at the same time must be the computer system having the lowest processor utilization of the possible computer systems. The security level of an authentication system indicates the strength of the technical and organizational measures ensuring that authentication data [is] in unchanged form [and] also really comes from the person for whom the authentication data was originally, e.g., during the registration process, provided. The security level can depend, e.g., on the minimum required length and/or complexity of passwords, the falsification security of the authentication data (various forms of biometric data, passwords, etc.), and/or on technical security measures that the operators of an authentication system provide to prevent manipulation of the authentication system by third parties. Another advantageous aspect of this is that it makes it possible, if a user has forgotten, e.g., his password, for the first authentication system, to provide, in a targeted and completely automated manner, an alternative authentication system that offers at least the same security level, or an even higher one than the first authentication system. Instead of sending the user an insecure e-mail with a password reset link, as has been common up to now, the user can authenticate himself on a second, especially secure authentication system, e.g., by means of a fingerprint, and after that automatically be recognized as authorized by the first authentication system.

According to embodiments, the user can authenticate himself with respect to the first or the second authentication system using an ID token, neither the ID token nor the first or second authentication system interacting with an eID provider computer system. Examples of this are ID tokens, e.g., special USB sticks that support the Gnubby U2F scheme developed by Google, or comparable U2F authentication systems. "U2F" means that the aforementioned ID token allows the user to identify himself with respect to one or more service computer systems by both having certain knowledge (work-specific permanent or transaction-specific password, etc.) and also physically possessing the ID token ("two factors": knowledge and possession). If the user cannot, e.g., authenticate himself with respect to the first authentication system, since he does not carry his ID token with him, but can alternatively authenticate himself with respect to the second authentication system by means of biometric data, this is sufficient, thanks to exchange of trust through the bridge computer system, for this user nevertheless to be considered sufficiency trustworthy by the first authentication system.

According to embodiments, the user can authenticate himself with respect to the first or the second authentication system using an ID token, some of these embodiments possibly also having an eID provider computer system involved in the authentication process. However, in contrast to the variant II described below, here the bridge computer system does not use the eID provider computer system as an alternative authentication system, and accordingly does not carry out any forwarding to the eID provider computer system (the register does not contain any reference value for carrying out the process according to variant II, and the address of the eID provider computer system might not even be known to the bridge computer system).

Variant II Distributed Authentication System With an eID Provider Computer System An alternative aspect of the invention relates to a distributed authentication system comprising at least a first computer system, a bridge computer system, and an eID provider computer system.

The first computer system provides a first authentication system. Moreover, it provides, over a network, a first service to one or more users that have been successfully authenticated through the first authentication system. The eID provider computer system is connected over a network with the first computer system, and provides, in cooperation with the eID provider computer system, an ID token-based authentication system.

The first authentication system is designed to receive a user authentication request with respect to this first authentication system. The first authentication system comprises an interface to receive the authentication request of a user computer system that is associated with the user. If the user's authentication attempt with respect to the first authentication system is unsuccessful, the first authentication system communicates this unsuccessful authentication attempt to the bridge computer system by means of a first message. If the bridge computer system receives the first message, it sends the user computer system a request to input at least a user ID, and receives in response to this request at least the user ID from the user computer system. For example, the first message can contain data that allows the bridge computer system to direct the request to the user computer system, e.g., address data of the user computer system. The bridge computer system contains a register that allows it to identify, by means of the received user ID, a reference value associated with the user, this reference value being stored in the register.

The bridge computer system initiates the execution of an ID token-based authentication system to authenticate the user with respect to the ID token-based authentication system. Execution of the ID token-based authentication system comprises comparison of the identified reference value with a data value received from an ID token that is associated with the user whose authentication attempt with respect to the first authentication system has failed.

If the user has successfully authenticated himself with respect to the ID token-based authentication system, the bridge computer system sends an identity confirmation message regarding the user to the first authentication system. If the first authentication system receives the identity confirmation message, it treats the user as successfully authenticated, and provides the first service to him.

This variant of the distributed authentication system has the advantage, analogous to that of variant I, that user-side storage and management of various authentication data for many authentication systems or service providers is no longer necessary: This increases the security, since the user no longer has to keep a large amount of sensitive authentication data with him. Moreover, variant II also helps avoid the possibly substantial effort that is connected with a manual/personal reregistration or reassignment of authentication data, without falling back on the prior art reset mechanisms, most of which are insecure and e-mail-based, in order to accomplish this.

Variant II of the distributed authentication system or its components also provides a modified "single sign-on" system, in which the sovereignty over the individual authentication systems of the services, including the registration process, remains in the [hands] of the individual service providers, and only falls back on a central trustworthy authority in the form of an eID provider computer system if the authentication data is not available for an individual, service-providing computer system.

First, this has the advantage that other service providers, which can, after all, also pursue opposite business interests, are not allowed any influence over whether or not a user who does not have his access data available, is considered trustworthy. This prevents potential manipulation: eID providers offer an infrastructure that is highly developed, in terms of security technology and organizationally, to provide unequivocal proof to third parties of the identity of certain persons who have registered once with this eID provider, eID providers are often sovereign authorities or are recognized as such. Therefore, eID provider computer systems are sources of identity information that are neutral in the business respect and especially trustworthy in the technical respect, which offer a technical security level with regard to identity information of a user that the authentication systems of "simpler" service providers such as, for instance, online department stores, or social networks cannot, as a rule, offer.

Another aspect of the invention relates to a bridge computer system that is operatively connected with an eID provider computer system. The bridge computer system provides, in cooperation with the eID provider computer system, an ID token-based authentication system. The bridge computer system comprises a register and a network interface to connect the bridge computer system over a network with one or more user computer systems and with a first computer system, as already previously described for variant I or II. The network interface is designed to receive a first message from the first computer system, the receipt of the first message indicating an unsuccessful authentication attempt by one of the users with respect to the first computer system. If the bridge computer system receives the first message, it sends the user computer system a request for input of at least a user ID that is associated with the user, and receives at least the user ID from the user computer system.

In contrast to the register described for variant I, the register of variant H contains user IDs, each of which is stored linked with one or more reference values. The bridge computer system identifies a reference value stored in the register on the basis of the received user ID. The bridge computer system initiates execution of the ID token-based authentication system to authenticate the user with respect to the ID token-based authentication system. Execution of the ID token-based authentication system comprises comparison of the identified reference value with a data value received from an ID token that is associated with the user. The comparison can be designed, e.g., as an identity comparison. If the user is successfully authenticated with respect to the ID token-based authentication system, the bridge computer system communicates an identity confirmation message regarding the user to the first authentication system to have the first computer system treat the user as successfully authenticated, and to provide the first service to him.

According to embodiments, the operative connection consists of the bridge computer system being connected, over the network, with the eID provider computer system. The network can be, e.g., a network open to everyone, e.g., the Internet.

Alternatively, the operative connection can be based on an Intranet of a computing center with protected security technology. This increases the security, since the communication between the bridge computer system and the eID provider computer system takes place within a protected network.

Alternatively, the operative connection is based on designing the eID provider computer system and the bridge computer system as hardware and/or firmware modules, each of which represents a component of an individual data processing device, e.g., a server computer. Furthermore, this increases the security and additionally offers the advantage that the hardware or firmware of the integrated data processing device can be optimized for rapid and trouble-free interaction of the two functionalities (those of the bridge computer system and those of the eID provider computer system). Moreover, the token-based authentication system is substantially accelerated, since the data can be transferred between the bridge computer system component and the integrated "eID provider computer system component" over a system bus, which has a substantially higher bandwidth than the Internet. Additional security measures such as, for instance negotiating session keys can be omitted.

According to embodiments, the distributed authentication system also comprises the ID token(s) of the user(s) that have registered for one or more services through their respective user computer systems.

Another aspect of the invention relates to a computer-implemented process to authenticate a user with respect to a first computer system. The process comprises:
  Sending an authentication request of the user from a user computer system associated with the user to a first authentication system of a first computer system. The first computer system provides, over a network, a first service to one or more users that have been successfully authenticated through the first authentication system;
  Receiving, by the first computer system, the authentication request; If the user authentication attempt with respect to the first authentication system is unsuccessful, sending a first message from the first computer system to a bridge computer system;
  Receiving the first message by the bridge computer system, which contains a register;
  In response to receiving the first message, sending a request, from the bridge computer system to the user computer system, to input a user ID associated with the user, to receive from the user computer system at least the user ID;
  Identifying, by the bridge computer system, a reference value stored in the register by means of the user's user ID that is received;
  Initiating the execution of an ID token-based authentication system to authenticate the user with respect to the ID token-based authentication system. Executing the ID token-based authentication system comprises comparison of the identified reference value with a data value that is generated by an ID token associated with the user or is read out of this ID token;
  If the user has successfully authenticated himself with respect to the ID token-based authentication system, the bridge computer system sends an identity confirmation message regarding the user to the first authentication system;
  In response to receiving the identity confirmation message, treating, by the first computer system, the user as successfully authenticated and providing the first service to the authenticated user.

According to embodiments, every execution of the ID token-based authentication system comprises authentication of the user with respect to the ID token and authentication of the eID provider computer system with respect to the ID token. If both the user and the eID provider computer system have been successfully authenticated with respect to the ID token, the process further comprises:
  Calculating the data value by the processor of the ID token;
  Transferring the data value from the ID token to the eID provider computer system;
  Transferring the data value from the eID provider computer system to the bridge computer system;
  Checking, by the bridge computer system, that the reference value stored in the register and identified on the basis of the user ID agrees with the data value transferred from the eID provider computer system;
  If there is agreement, considering the user to have been successfully authenticated with respect to the ID token-based authentication system.

This can be advantageous since the data value that is compared with the reference value is not a value stored in the ID token, but rather is dynamically calculated by the ID token during the authentication process, and transferred to the bridge computer system. That is, the reference value cannot be read by third parties, which have, e.g., come into unauthorized possession of the ID token, since the value is only calculated, e.g., by means of a PIN, after successful authentication of the authorized user. This data value can be calculated from the ID token, e.g., during the registration process, and stored, together with a user ID, as a reference value in the register of the bridge computer system. Every time the user is authenticated with respect to the ID token-based authentication system, the data value is recalculated by the processor of the ID token, to transfer it to the bridge computer system and compare it with the reference value. That is, this embodiment increases the security of the process, in particular it provides protection against unauthorized authentication of the ID token by a thief. The data value can be calculated from a label of the ID token, for example. For example, the ID token could be in the form of an electronic identity card, and the user ID could be the "restricted identifier" (RID) of a user identity card used as an ID token. The RID is unique for the identity card, and thus also unique for the user. The derivation function can be any derivation function, preferably an injective one.

According to embodiments, calculating the data value by the processor of the ID token comprises the following:
  Receiving an authorization certificate associated with the bridge computer system by the ID token. The authorization certificate contains a public key of the bridge computer system; for example, this makes it possible for the ID token to ensure, by checking this certificate, that the bridge computer system is trustworthy;
  Applying a derivation function, which derives, with the help of a private key of the ID token, the data value from the public key of the bridge computer system, the data value being specific not only for the user, but rather also for the bridge computer system.

In this embodiment as well, the ID token performs, preferably during the first registration of the user, an initial calculation and storage of the reference value by means of the derivation function.

According to embodiments, the process comprises a further step of the eID provider computer system signing the data value before it is transferred to the bridge computer system. Signing is done using a private key of the eID provider computer system. The data value is transferred in signed form from the eID provider computer system to the bridge computer system. The user is considered to have been successfully authenticated by the ID token-based authentication system only once the bridge computer system has additionally established the validity of the signature by means of a signature check. This can be done, for example, by the bridge computer system knowing a public key that forms, together with the private key used for signing, an asymmetric cryptographic key pair.

According to embodiments, the eID provider computer system has stored at least one certificate that comprises attribute information. This attribute information comprises the attributes provided (i.e., stored and/or calculated) by the ID token for whose corresponding attribute values the eID computer system has read or receive permission. Authentication of the eID provider computer system with respect to the ID token comprises the following:

Transferring a certificate from the eID provider computer system to the ID token, the data value calculated by the processor of the ID token representing an attribute value of one of these attributes indicated in the certificate;

Checking, by the ID token on the basis of the transferred certificate, whether the eID provider computer system has the required permission to receive the calculated data value, before this data value is calculated and transferred to the eID provider computer system.

These features can be advantageous, since they ensure that the data value that serves to authenticate the user with respect to the ID token-based authentication system is only calculated, and the processor of the ID token is only utilized, once the eID provider computer system also has been authorized to receive this data value to be calculated.

According to some embodiments, the ID token possesses means for an end-to-end encryption to set up, through the user computer system, a connection between the ID token and the eID provider computer system. The certificate with the attribute information and/or the stored or calculated data value is transferred over the end-to-end encrypted connection. The end-to-end encryption makes it impossible for the user to change the data transferred over the connection, which further increases the security of the process.

Variants I and II: Other Embodiments

The discussion below will address embodiments and aspects of the invention that can be realized both on the basis of the teaching of variant I and on the basis of the teaching of variant II.

Another aspect of the invention relates to a computer-implemented process to authenticate a user with respect to a computer system. The "computer system" corresponds to the first computer system according to the terminology used above, that is to the computer system with respect to whose authentication system the user really wants to authenticate himself, but at first does so unsuccessfully. The computer system provides an authentication system. Moreover, it provides, over a network, a service to one or more users that have been successfully authenticated through the authentication system. The process comprises:

Receiving, by the authentication system, an authentication request of one of the users from a user computer system associated with the user over the network;

If the user's authentication attempt with respect to the authentication system is unsuccessful, sending, by the authentication system, a first message over the network to the bridge computer system, this first message informing it about the unsuccessful authentication attempt.

If an identity confirmation message regarding the user is received from the bridge computer system in response to the first message, treating the user as successfully authenticated by the authentication system and providing the service to the authenticated user by the computer system.

The computer system and the bridge computer system are operated by different persons or organizations. The implementation of the authentication system is exclusively subject to the decisions of the operator of the respective computer system.

According to embodiments, after receiving the identity confirmation message, the first authentication system not only treats the user as successfully authenticated, but rather automatically gives the user an opportunity to reset, or at least view, his authentication data for the first authentication system.

According to embodiments, the first computer system additionally comprises all the above-described functional capabilities of the second computer system, and the second computer system has all the above-described functional capabilities of the first computer system. This means that the second authentication system of the second computer system is automatically recognized and used as an alternative authentication system if the authentication with respect to the first authentication system really intended by the user fails, but that conversely the first authentication system of the first computer system is also automatically recognized and used as an alternative authentication system if an authentication with respect to the second authentication system (to use the second service) really intended by the user fails.

According to embodiments, the first comprises a first application program that interoperates with a second application program of the bridge computer system, to effect the described data exchange between the first computer system and the bridge computer system. That is, the first application program is able to send the first message to the bridge computer system and to receive the identity confirmation message from the bridge computer system. Moreover, it is able to interoperate with the first authentication system in such a way that it registers a failure of an authentication attempt of a user with respect to the first authentication system, and following that sends the first message, and after receiving the identity confirmation message it causes the first authentication system to treat the user as authenticated.

According to embodiments of variant h, the first application program also possesses, in addition to these aforementioned program functionalities, the following program functionalities: an interface to trigger a command from the bridge computer system to initiate a process of authenticating a user with respect to the first authentication system. That is, in the first place the execution of the first authentication system can be initiated if a user wants to authenticate himself with respect to the first authentication system to use the first service. In the second place, it can be initiated by the first application program, which is caused to do this by the bridge computer system, if a user could not authenticate himself with respect to another authentication system. Through the interface, the first application program can receive, e.g., address data of the user computer system to start, with the user of the user computer system, an authentication process with respect to the first authentication system. Through this interface, the first application program can communicate to the bridge computer system the result of this authentication process. By doing so, the first computer system or the first authentication system assumes the function of an alternative authentication system. That is, the first application program can, in the first place, make an authentication system installed on the same computer system automatically redirect a user who could not authenticate himself to other authentication systems to serve as alternative authentication systems, and in the second place, it can make the authentication system installed on the same computer system function as an alternative authentication system for the authentication systems of other service providers. The first application program can be installed on the first, second, and possibly still other computer systems, each of which offers a service, so that each of the authentication systems of these computer systems can be used as a 'fallback' authentication system for the other authentication systems. According to embodiments, the first application program can be installed and uninstalled independently of the authentication system that is also running on the computer system. This can be advantageous since it allows the first application program to leave existing authentication systems, in particular legacy authentication systems, essentially unchanged and nevertheless allows interaction between the authentication system and the second application program on the bridge computer system.

The data exchange between the first and second application programs can be based, e.g., on EJB Technologie, Remote Procedure Calls, the .NET platform, or another framework.

According to embodiments, the authentication request is transferred over a first communications link. The first communications link is between the user computer system and the first computer system. After receiving the first message, the bridge computer system sets up a second communications link between the user computer system and the bridge computer system. In variant I, the bridge computer system sets up a third communications link between the user computer system and the second computer system to initiate execution of the second authentication system, and, if the user is successfully authenticated with respect to the second authentication system, re-establishes the first communications link. In variant H, the bridge computer system sets up a third communications link between the user computer system and the eID provider computer system to initiate execution of the ID token-based authentication system, and, if the user is successfully authenticated with respect to the ID token-based authentication system, re-establishes the first communications link.

According to embodiments, the first, second, and/or third communications links are preferably protected, e.g., by means of SSH encryption or another encryption process.

According to embodiments, the setup of the second communications link is based on forwarding the user computer system to an address of the bridge computer system. In variant I, the setup of the third communications link between the user computer system and the second computer system is based on forwarding the user computer system to the identified address, e.g., a URL, of the second computer system. In variant II, the setup of the third communications link between the user computer system and the eID provider computer system is based on forwarding the user computer system to an address, e.g., a URL, of the eID provider computer system. Re-establishing the first communications link is based on forwarding the user computer system to an address, e.g., a URL or IP address, of the first computer system by the bridge computer system. Preferably, the forwarding is based on a URL redirect of a browser running on the user computer system or another HTML-capable client. The forwarding can be based on the http or https protocol and be implemented as domain forwarding.

According to embodiments, the bridge computer system uses a session ID agreed during the unsuccessful authentication attempt between the user computer system and the first computer system to set up the second and third communications links, and/or uses the session ID to store, temporarily and/or persistently, parameter values associated with the session ID. This is advantageous, since session-specific data of the unsuccessful authentication attempt is available throughout the entire authentication process, that is, the user need not re-input it after the first communications link is re-established. Opening another authentication session is avoided by the identity confirmation message. This accelerates the process, makes it more convenient to use, and reduces the data traffic, since the user does not have to re-input the parameter values.

Another aspect of the invention relates to a computer-implemented nonvolatile storage medium. The storage medium contains computer-interpretable instructions. When a processor executes the instructions, it carries out the computer-implemented process according to one of the previous embodiments. The storage medium can selectively comprise the instructions for executing only the steps to be executed by the bridge computer system or only the steps to be executed by the first computer system or only the steps to be executed by the second computer system. Alternatively, the storage medium can also be a distributed storage medium that comprises all the steps to be executed by the first computer system, the second computer system, and the bridge computer system in the form of stored computer-interpretable instructions.

Figure 1B:
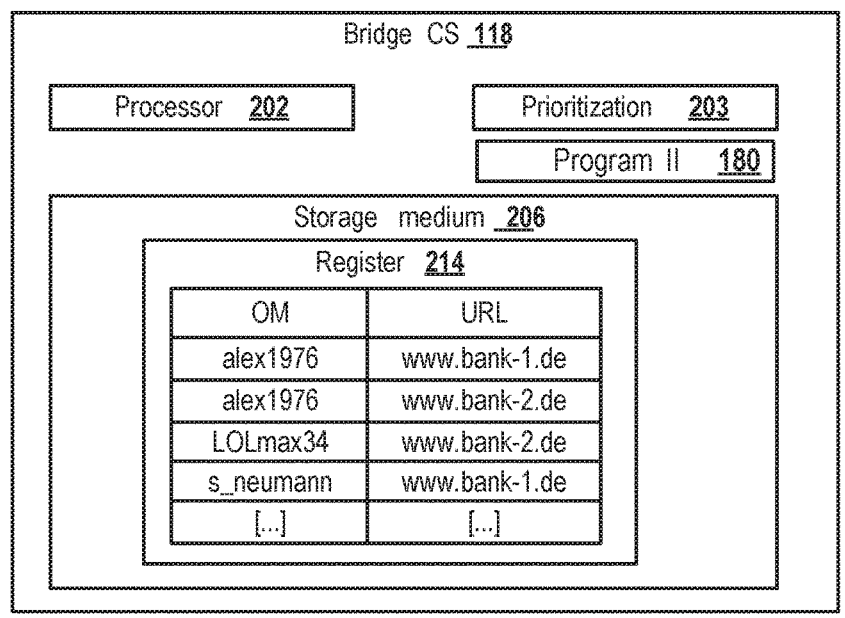
Figure 2A:
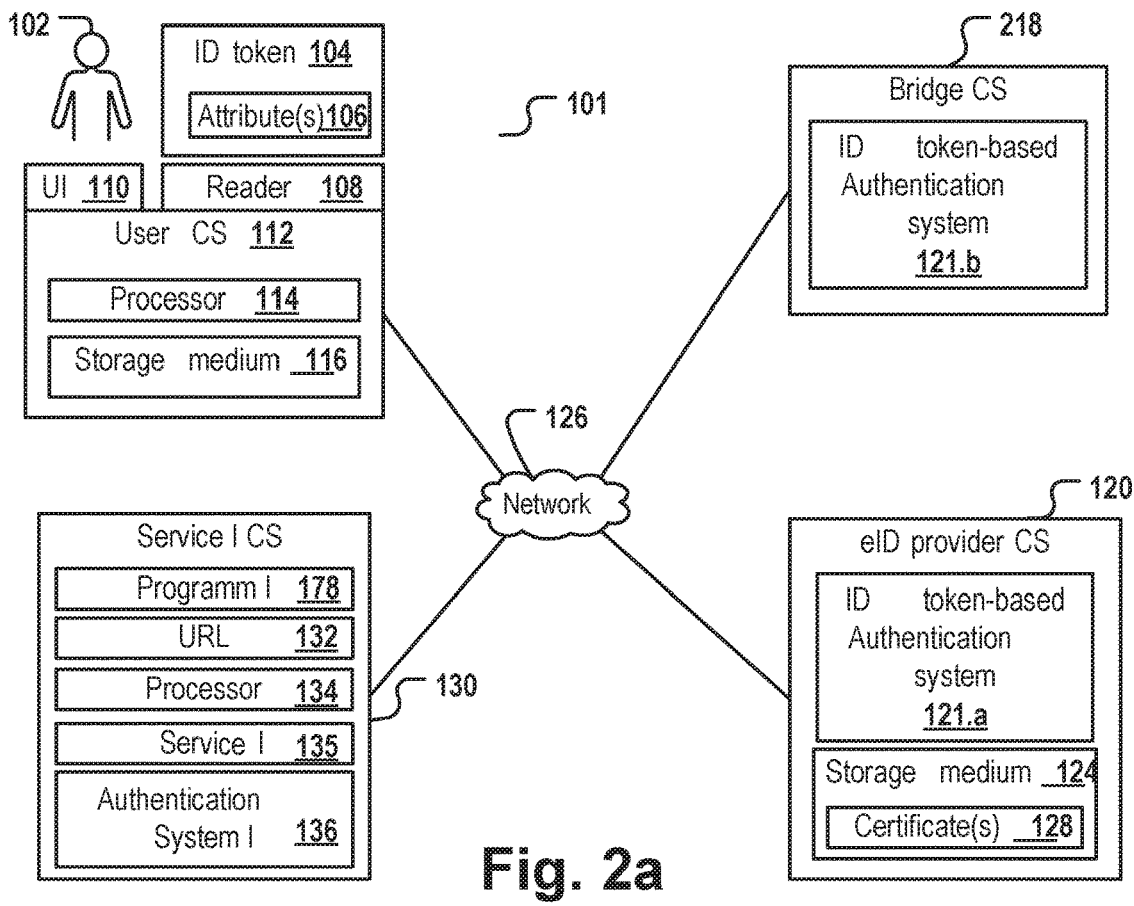
Figure 2B:
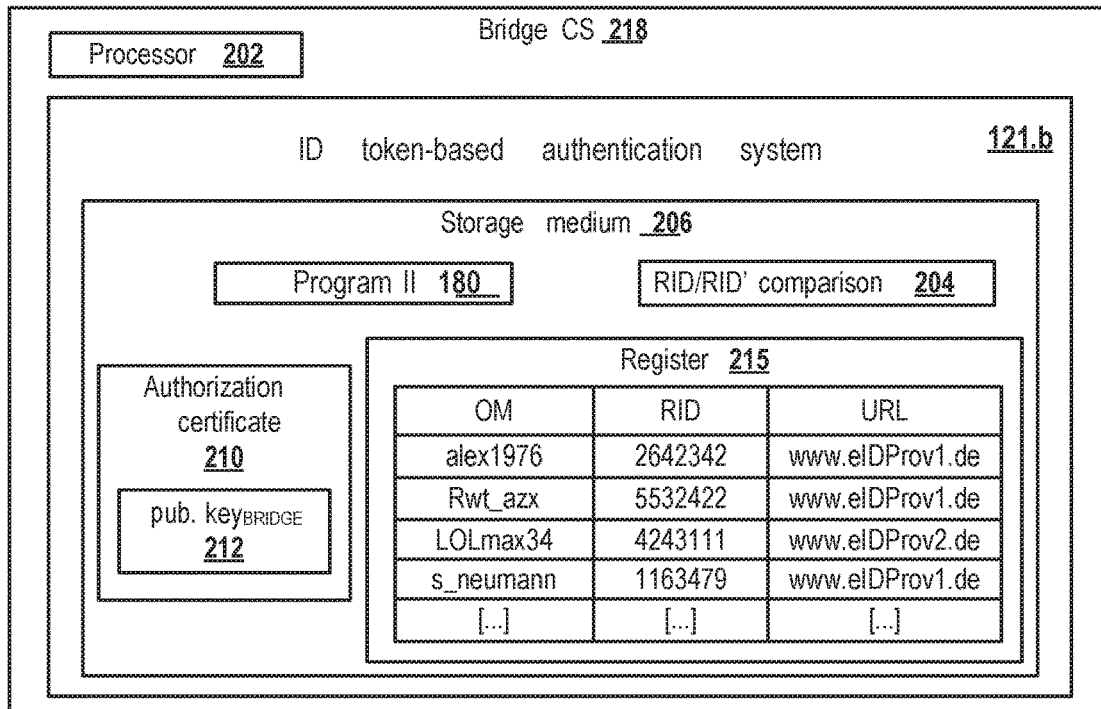
Figure 3:
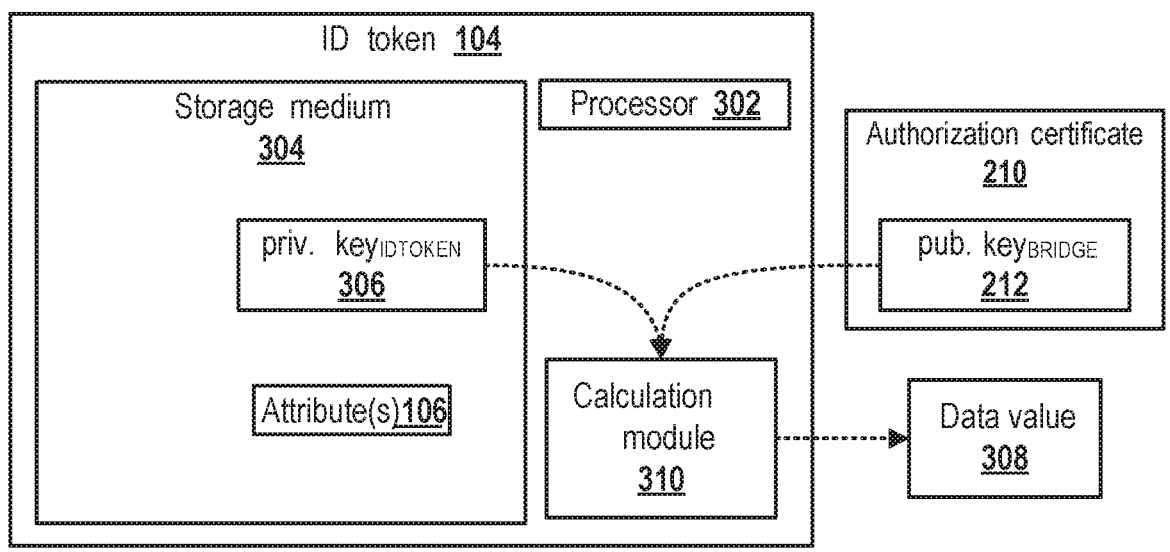
Figure 4:
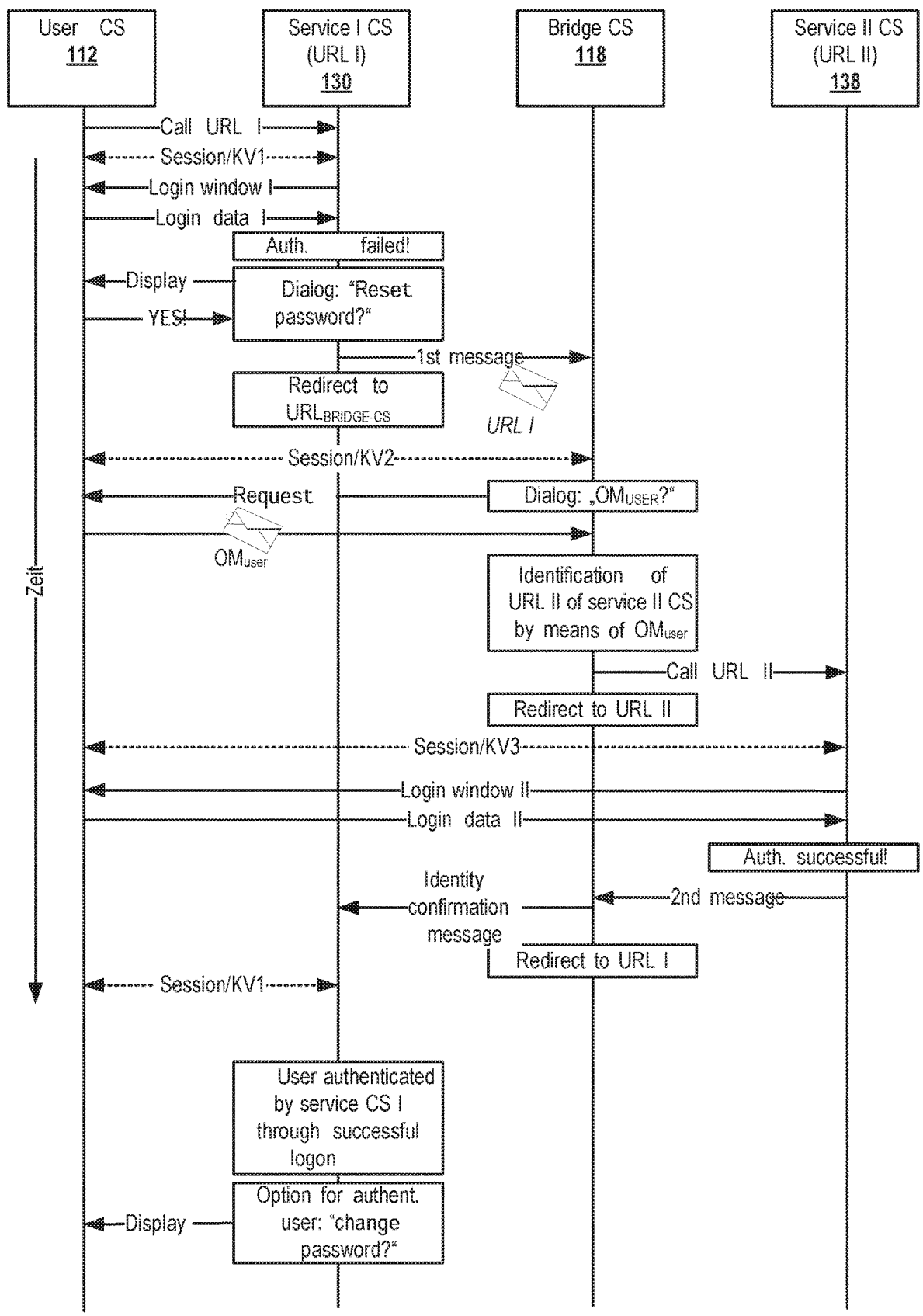
Figure 5:
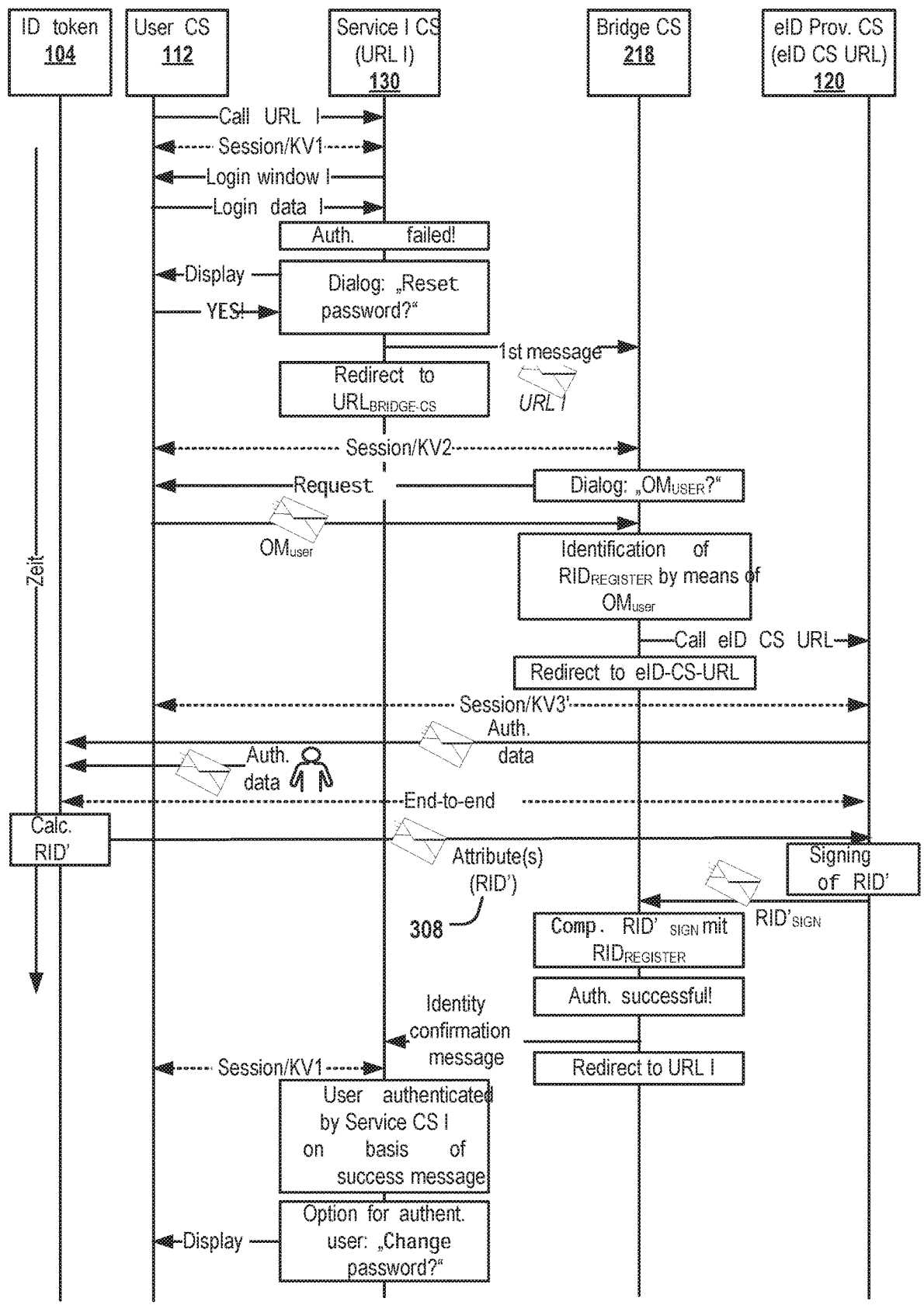

Embodiments of the invention will be explained in detail below with reference to the drawings. The figures are as follows:

FIG. 1a A block diagram of variant I of a distributed authentication system;

FIG. 1b A block diagram of variant I of a bridge computer system;

FIG. 2a A block diagram of variant II of a distributed authentication system;

FIG. 2b A block diagram of variant II of a bridge computer system;

FIG. 3 A block diagram of an ID token;

FIG. 4 A process diagram of the data exchange in variant I of a distributed authentication system; and FIG. 5 A process diagram of the data exchange in variant II of a distributed authentication system.

Elements of the following embodiments that correspond to one another are labeled with the same reference numbers.

FIG. 1a shows variant I of a distributed authentication system 100. It is described below, on the basis of FIG. 1a with the help of FIG. 4, how user 102 can authenticate himself with respect to a certain service 135 of a first computer system 130, although the authentication data really required for authentication with respect to the first authentication system 136 is not available to the user.

The user 102 is associated with a user computer system 112 with a processor 114 and a storage medium 116. The user computer system has an interface 110 to input authentication data, that is for example, a graphical user interface and/or, in the case of biometric data, a fingerprint sensor, a camera, a microphone, or something of that kind. The authentication data can be, for example, a password, however many other types of authentication data are also possible, for example, biometric data (fingerprints, iris scans, facial recognition, typing patterns, etc.) and/or ID tokens (USB sticks, security documents such as, for instance the electronic identity card, etc.).

The distributed authentication system comprises a bridge computer system 118 whose components are explained in detail in FIG. 1b. Moreover, it comprises a first computer system 130 and a second computer system 138, and can optionally comprise still other computer systems, for example a third computer system 170.

The first computer system 130 possesses an address 132 and a processor 134, and provides a first service 135 that the user 102 wants to use. The service can be, for example, a bank service that allows the user 102 to make a transfer through online banking. To accomplish this, the first computer system, a bank server, requires authentication of the user 102 through the interface 110. This can be done, for example, by designing the first authentication system as a web application that generates an HTML-based form to input authentication data (user name, password, and possibly still other data). This electronic input form or the HTML code on which the form is based is transferred over the network 126 to the user computer system 112, where it is presented to the user in a browser or another HTML-capable client program. The transfer of this HTML form can be initiated, for example, by the user inputting in his browser a corresponding URL of the bank service. The form can be provided by means of various programming techniques (JavaScript, JavaServer Pages, servlets, Java EJB, Ruby, etc.).

Preferably, a first session is agreed between the user computer system and the first computer system, session keys are generated, and a secure, encrypted first communication channel KV1 is set up (see FIG. 4). This serves for secure transfer of the authentication data, especially the password, to the first authentication system 136 of the first computer system 130.

However, in this case the user 102 has incorrectly memorized his password for the first authentication system, and thus for the bank service 135, and inputs a wrong password multiple times. Alternatively, the user 102 can also know from the outset that he has forgotten his password for the bank service. The HTML form can have a button with the label "Reset password" or "Request new password" or something similar, and the user could click this button. Alternatively, this button can also be displayed only after the password has been incorrectly input multiple times. In any case, the interaction of the user with the form of the bank service provider reveals that the required password is not available to the user, which corresponds to a failed authentication attempt.

That is, after the first authentication system 136 has found that an authentication attempt of a certain user 102, of whom at least an address of the user computer system 112 is known, has failed, the service-providing first computer system generates a first message and sends it over the network 126 to a bridge computer system 118. The first message contains at least information that allows the bridge computer system to send a request to the user computer system to receive the user ID.

The bridge computer system receives the first message, sends the user computer system a request to receive the user ID, and finally also receives the user ID over the network. Preferably, before the user ID is transferred, a secure data transmission channel KV2 is set up between the user computer system and the bridge computer system. The bridge computer system identifies, with the help of a register 214, a second computer system 138, that is connected, over the network 126, with the bridge computer system, and is also associated with the user 102 in the aforementioned register. Association of a user and a computer system 130, 138, 170 implies that the user has already registered with each of these computer systems or the authentication systems of each of these computer systems, and also should, in theory, be able to authenticate himself with respect to these computer systems/authentication systems. On the basis of the user ID and the register 214, the bridge computer system determines an address, for example a URL, of another computer system 138 whose authentication system 144 can be assumed to be useable as an alternative authentication system. The identified address of the computer system 138 that provides the alternative authentication system 144 and that is also referred to below as the "second computer system", is used by the bridge computer system to set up a third communication channel KV3 that is preferably also protected. The second computer system could be, for example, a server of another bank that provides another bank service 143. However, it could also be the server of an online shop operator that provides an online shop 143 over the network. The type of the service 143 that is provided by the second computer system is not important per se, since after all it is the first service 135 that the user wants to use.

The third communication channel could be set up by the second service computer system 138 providing a second authentication system 144 in the form of a web application. The bridge computer system could send the second computer system 138 an address of the user computer system in another message. The web application of the second computer system could generate another HTML form and send this form or the HTML code on which the form is based to the address of the user computer system. There, this form is displayed in the user's browser or in an HTML-capable client program that is interoperable with the second authentication system 144. In FIG. 4, the generation, transfer, and display of this HTML form is labeled "Login window II". If the user still knows at least his login data for the second authentication system 144, he can use this data to authenticate himself with respect to the second authentication system. Thus, the second authentication system acts as an automatically recognized and initiated alternative authentication system, but is otherwise separate, organizationally and in terms of security technology, from the first authentication system.

After successful authentication of the user 102 with respect to the second authentication system 144, the second authentication system, that is, for example the web application, sends a second message to the bridge computer system containing the information that the user has successfully authenticated himself with respect to the second authentication system.

If this authentication attempt with respect to the second authentication system should also fail, in some sample implementations this is also communicated to the bridge computer system. In this case, the bridge computer system searches in the register 214 for other computer systems that could provide an alternative authentication system, for example the third computer system 170, and initiates execution of the third authentication system 172, to display to the user a login window for the third authentication system. In this way it is possible to initiate a cascade of alternative authentication systems that is, in theory, arbitrarily long, until the user can successfully authenticate himself with respect to one of the alternative authentication systems and this is communicated as proof of the user's trustworthiness with respect to the first authentication system. This cascade of alternatively initiated authentication systems could, e.g., take place in a certain order, e.g., starting from an authentication system with the highest security level all the way to one that is equivalent to or lower than that of the first authentication system.

After the identity confirmation message is received by the first authentication system, it treats the user 102 as authenticated with respect to the first authentication system 136, and provides the requested first service 135. That is, the user receives, through his browser or through a client application that is executed on the user computer system 112 and that is interoperable with the service application 135, the capability to carry out a bank transaction. In addition, the browser or client application can display to the user an input mask to reset, change, or view his current authentication data (for example his password). Preferably, the first service and/or the aforementioned input mask is communicated over a secure data transmission channel KV1.

For example, a session with corresponding session keys can be agreed between the user computer system 112 and the first computer system 130 already during the first, failed authentication attempt. The session can have bound to it, for example by means of a "session ID", various parameters that are input by the user and/or are automatically read out from the user computer system and that are necessary or helpful for the execution of the first service. These parameters could be, for example, the billing and shipping address of an order form that by the user has already at least partly filled out, or something of that kind. During the redirects, the session ID can be passed on from the first communication channel KV1 to the second communication channel KV2, from the second to the third communication channel KV3, and from the third communication channel KV3 to the first communication channel KV1, and serve as a session ID for each of the communication channels. During all the redirects, the user computer system can buffer the parameter values, linked with the session ID, in a volatile or nonvolatile storage medium, to use these parameter values when the first service is finally successfully provided to the user 102. Thus, the user need not input these values again.

In the example shown in FIG. 1*a*, the data exchange that takes place between the first or second authentication system is not direct, but rather through a first application program 178 that interoperates with a second application program 180 that is installed on the bridge computer system.

FIG. 1*b* is a detailed block diagram that shows a bridge computer system 118 according to variant I and its components.

The bridge computer system contains a processor 202 and a machine-readable storage medium 206, for example an electronic, magnetic, optical, electromagnetic, or other storage medium. The medium can be in the form of a portable computer diskette, a hard disk, an EPROM or flash memory, or something of that kind.

The storage medium has a register 214 stored on it. This register contains a list of user IDs, labeled OM in the figure, of a number of different users. The user 102 could have the ID "alex1976", for example. Each of the user IDs is associated with one or more computer systems 130, 138, 170, whose authentication systems can serve as alternative authentication systems. The association means that the user is already registered in the respective authentication systems of the computers 130, 138, 170 associated with the user, that is, the user has authentication data to authenticate himself with respect to these authentication systems. However, the authentication data itself is not stored in the register or another data container of the bridge computer system. In addition, the bridge computer system can have a prioritization module 203 that has an influence on what alternative computer system or authentication system should be selected if the addresses of multiple computer systems are associated with the user. The addresses can be in the form of "Uniform Resource Locators" (URLs), for example, and allow the bridge computer system to initiate execution of the authentication system of the associated computer system. The second application program 180 is able to access the register and possibly also the prioritization module, and to interoperate with each of the first application programs 178 on the individual service computer systems 130, 138, 170 to allow data exchange between the bridge computer system and the first, second, and possibly other computer systems. The second application program 180 can be, e.g., a web application that is provided by a web application server program.

FIG. 2*a* shows variant II of a distributed authentication system 101. It is described below, on the basis of FIG. 2*a* with the help of FIG. 5, how user 102 can authenticate himself with respect to a certain service 135 of a first computer system 130, although the authentication data really required for authentication with respect to the first authentication system 136 is not available to the user.

To avoid repetition, the discussion below will predominantly describe those aspects that distinguish variant II from variant I. Components and computer systems that are not discussed in detail function as was already previously described for variant I on the basis of FIGS. 1*a*, 1*b*, and 4.

Variant II of the distributed authentication system 101 comprises at least one computer system 130 that provides an authentication system 136 over a network 126. Moreover, this computer system provides a service 135 over the network, however only to users that have successfully authenticated themselves with respect to the authentication system 136. Furthermore, the distributed authentication system 101 comprises a bridge computer system 218 and an eID provider computer system 120. The distributed authentication system 101 can also comprise many other computer systems 138, 170, as shown in FIG. 1*a*, however here these other computer systems do not have the function of providing an alternative fallback authentication system, but rather only represent other computer systems, each of which uses the ID token-based authentication system 121 as an alternative fallback authentication system. The ID token-based authentication system 121 is provided by the bridge computer system in cooperation with the eID provider computer system.

The user computer system 112 comprises a reader 108 or is operatively coupled to such a reader. The reader allows data exchange between the user computer system 112 and an ID token 104 on which user-specific data, e.g., one or more attributes 106, are securely stored. The ID token 104 is personally associated with the user 102.

The bridge computer system 218, whose components are explained in detail in FIG. 2b, has a storage medium 106 with a register 215. It contains a number of user IDs, labeled OM in the figure, for example 'alex1976' or 's_neumann', as depicted in FIG. 2b. However, in contrast to the register 214 of variant I, each of these user IDs is associated with a reference value (FIG. 2b: values in the column "RID"). It is possible for the distributed authentication system 101 to comprise multiple eID provider computer systems and for different users to be associated with the addresses ("www.eIDProv1.de", "www.eIDProv2de") of different eID provider computer systems. However, the system 101 typically comprises only one eID provider computer system, whose address is stored in the register or another place on the storage medium 206. Moreover, the bridge computer system 218 comprises a module 204 to compare a user-specific reference value with a data value 308 provided by a user ID token, this module making a decision about whether or not, in view of the result of the comparison "data value vs. reference value", an identity confirmation message for the user 102 should be sent to the computer system 130.

As was already described for variant I of the system, the user 102 attempts to use a bank service 135, but fails when authenticating himself with respect to the authentication system 136 of the bank service provider. The authentication system 136 of the bank service provider sends a first message (see FIG. 5) to the bridge computer system 218. The bridge computer system 218 receives an address of the user computer system 112, and sends the user computer system a request to input a user ID, as described. The user ID that the bridge computer system [218] receives in response to this request is now used to identify, on the basis of the register 215, a reference value RID personally associated with the user through his user ID. Moreover, the bridge computer system 218 initiates the execution of an ID token-based authentication system 121. The ID token-based authentication system comprises, at one part 121.a, the transfer of a data value 308 from an ID token to the eID computer system, and at another part 121.b, the transfer of this data value to the bridge computer system and the comparison of this transferred value with a user-specific reference value stored in the register.

During the authentication process, a relocation is carried out (e.g., by URL redirect), and a secure data transmission channel KV3' is set up between the user computer system 112 and the eID provider computer system. While the ID token-based authentication system is being executed, both the user 102 is authenticated, for example by inputting a PIN, and also the eID provider computer system is authenticated, for example by means of a certificate, these authentications being carried out with respect to the ID token 104 of the user 102. After successful authentication of both the user and the eID provider computer system, an end-to-end encrypted channel is set up between the ID token and the eID provider computer system, and a data value 308 is transferred over this channel from the ID token to the eID provider computer system. The data value is transferred from the eID provider computer system 120 to the bridge computer system 218, where it is compared, by the comparison module 204, with a reference value that is associated with the user 102 and is stored in the register 215. To increase the security, the data value can also be signed by the eID provider computer system before it is transferred. If the comparison module 204 establishes that the received data value 308 agrees with the stored reference value, the user 102 is considered to be trustworthy, and an identity confirmation message is sent from the bridge computer system 218 to the computer system 130 that provides the bank service. The other steps are carried out as already previously described for variant I.

FIG. 2b is a block diagram that shows a bridge computer system 218 according to variant II and its components in detail.

The storage medium 206 has a register 215 stored on it. This register contains a list of user IDs, labeled OM in the figure, of a number of different users. The user 102 could have the ID "alex1976", for example. Each of the user IDs is associated with a reference value, that is, for example, the user ID 'alex1976' is associated with a value '2642342'. A comparison module 204 is able to compare a data value 308, which is received from the bridge computer system 218 during execution of the ID token-based authentication system 121, with the user's reference value that is stored in the register. If they are identical, the bridge computer system 218 sends an identity confirmation message to the computer system 130 providing the service. According to some variant implementations, the bridge computer system can additionally have an authorization certificate 210 with a public key 212, whose function is explained in detail below on the basis of FIG. 3.

FIG. 3 is a block diagram of an ID token 104 that is associated with the user 102. It comprises a processor 302, a storage medium 304, and a calculation module 310 to calculate a data value 308, which should identify the user as authorized during execution of the ID token-based authentication system. The memory has one or more user-specific attributes 106 stored in it. The attributes can relate to personal data such as name, age, address, or similar things, for example. Moreover, a private key 306 of the ID token is stored on the storage medium. The ID token can be, for example, a chip card. In particular, the ID token can be an electronic identity card.

During the ID token-based authentication, an authorization certificate 210 associated with the bridge computer system is transferred, along with a public key 212 for the bridge computer system, from the eID provider computer system to the ID token 104. The processor 302 of the ID token 104 carries out a derivation function according to the instructions of the calculation module 310, which uses the private key 306 ("priv.key$_{IDTOKEN}$") of the ID token to derive a data value 308 from the public key 212. The derived data value 308, whose derivation involves the public key 212 ("pub.key$_{BRIDGE}$") of the bridge computer system, is preferably specific to the bridge computer system 218 and the user or its ID token. The derivation function can consist, for example, of a multiplication function, and the derived data value 308 is the product of the public key 212 and the private key 306. Alternatively, however, more complex derivation functions can also be used.

For example, the derived data value 308 can be derived from the public key 212 and the private key 306 according to the 'Restricted Identification' (RI) protocol that is specified in the technical guideline TR-03110 of the German Federal Office for Information Security (BSI). That is, the derived data value represents a pseudonym, which is advantageous since it allows authentication of the ID token with respect to the bridge computer system, without the user's real name being revealed during the authentication process by this data value 308, which serves for data protection. The restricted identification 308 can be calculated by means of a key-agreement function KA, e.g., a Diffie-Hellman key exchange and a hash algorithm H, e.g., according to the formula:

$$RI_{BRIDGE\text{-}IDTOKEN} = H(KA(priv.key_{IDTOKEN}, pub.key_{BRIDGE}, domain\ parameter));$$

Disregarding the (very unlikely) case of hash collisions, the generated data value 308 ($RI_{BRIDGE-TOKEN}$) is unique for this combination of bridge computer system and ID token.

According to variant I, if an ID token is used for authentication with respect to one of the first computer systems, each of which provides a service, the data value 308 can be calculated in a completely analogous manner: An authorization certificate specifically associated with the first computer system or its service was securely stored on the user's ID token during the user's registration for this service. The processor 302 of the ID token 104 carries out a derivation function according to the instructions of the calculation module 310, which uses the private key 306 ("priv.key$_{ID\text{-}TOKEN}$") of the ID token to derive a data value 308 from the public key of the first computer system. The derived data value 308, whose derivation involves the public key 212 ("pub.key$_{SERVICE}$") of the first computer system 130, is preferably specific for this first computer system 130 or its service and the user or his ID token. The derivation function can consist of a multiplication function or of a complex derivation function, e.g., the RI protocol. The analogous formula of the derivation function here would be as follows:

$$RI_{SERVICE\ IDTOKEN} = H(KA(priv.key_{IDTOKEN}, pub.key_{SERVICE}, domain\ parameter));$$

The data value 308 is now signed using the private key 306 of the ID token and transferred in signed form to the eID provider computer system 120. The data value is preferably transferred over an end-to-end encrypted connection between the ID token and the eID provider computer system. The eID provider computer system forwards the data value 308 to the bridge computer system 118 so that it can be compared with a reference value and possibly have its signature checked.

LIST OF REFERENCE NUMBERS

100 Distributed authentication system, variant I
101 Distributed authentication system, variant H
102 User
104 ID token
106 Attribute(s)
108 Reader
110 User interface
112 User computer system
114 Processor
116 Storage medium
118 Bridge computer system, variant I
120 eID provider computer system
121 ID token-based authentication system
124 Storage medium
126 Network
128 Certificate(s)
130 First computer system
132 Address of first computer system
134 Processor
135 First service
136 First authentication system
138 Second computer system
140 Address of second computer system
142 Processor
143 Second service
144 Second authentication system
170 Third computer system
172 Third authentication system
174 Storage medium
176 Third service
178 First application program
180 Second application program
202 Processor
203 Prioritization module
204 Module for data value comparison
206 Storage medium
210 Authorization certificate
212 Public key$_{bridge\ computer\ system}$
214 Register, variant I
215 Register, variant II
218 Bridge computer system, variant II
302 Processor
304 Storage medium
306 Private key$_{ID\ token}$
308 Calculated data value
310 Calculation module

The invention claimed is:

1. A distributed authentication system comprising:
a first computer system configured to,
   first authenticate a user in response to receiving a first request from a user computer system of the user,
   send a first message to a bridge computer system in response to determining that the first authentication was unsuccessful,
   determine that the user has been successfully authenticated based on receiving an identify confirmation message from the bridge computer system, and
   provide a first service to the user over a network in response to determining that the user has been successfully authenticated;
a second computer system different from the first computer system and the bridge computer system, the second computer system configured to,
   second authenticate the user, and
   provide a second service to the user over the network in response to determining that the user has been successfully authenticated; and
the bridge computer system configured to,
   send a second request to the user computer system of the user requesting a user ID of the user in response to receiving the first message,
   receive the user ID in response to the second request,
   identify an address of the second computer system stored in association with the received user ID,
   cause the second computer system to second authenticate the user in response to the identification,
   receive an indication from the second computer system that the second authentication was successful, and
   send the identify confirmation message regarding the user to the first computer system in response to the reception of the indication.

2. A distributed authentication system comprising:
a first computer system configured to,
   first authenticate a user in response to receiving a first request from a user computer system of the user,
   send a first message to a bridge computer system in response to determining that the first authentication was unsuccessful,
   determine that the user has been successfully authenticated based on receiving an identify confirmation message from the bridge computer system, and
   provide a first service to the user over a network in response to determining that the user has been successfully authenticated;

an eID provider computer system different from the first computer system and the bridge computer system, the eID provider computer system configured to perform ID token-based authentication; and the bridge computer system configured to,
send a second request to the user computer system of the user requesting a user ID of the user in response to receiving the first message,
receive the user ID in response to the second request,
identify a reference value stored in association with the received user ID,
cause the eID provider computer system to perform the ID token-based authentication based on the identified reference value, the ID token-based authentication including comparing the identified reference value with a data value received from an ID token associated with the user, and
send the identify confirmation message regarding the user to the first computer system in response to determining that the ID token-based authentication based on the identified reference value was successful.

3. A bridge computer system comprising:
a memory storing,
computer-readable instructions, and
a plurality of associations between a plurality of user IDs and a plurality of computer systems; and
at least one processor configured to execute the computer-readable instructions to,
receive a first message from a first computer system of the plurality of computer systems, the first message indicating an unsuccessful first authentication attempt by a user, the first computer system being configured to provide a first service to the user over a network in response to determining that the user has been successfully authenticated,
send a request to a user computer system of the user requesting a first user ID of the user in response to receiving the first message, the first user ID being one of the plurality of user IDs,
receive the user ID in response to the request,
identify an address of a second computer system of the plurality of computer systems based on the received user ID and the plurality of associations, the second computer system being configured to provide a second service to the user over the network in response to determining that the user has been successfully authenticated, the second computer system being different from the first computer system and the bridge computer system,
cause the second computer system to second authenticate the user,
receive an indication from the second computer system that the second authentication was successful, and
send an identity confirmation message regarding the user to the first computer system in response to the reception of the indication, the identity confirmation message causing the first computer system to determine that the user has been successfully authenticated.

4. A bridge computer system, comprising:
a memory storing,
computer-readable instructions, and
a plurality of associations between a plurality of user IDs and a plurality of reference values; and
at least one processor configured to execute the computer-readable instructions to,
receive a first message from a first computer system indicating an unsuccessful first authentication attempt by a user, the first computer system providing a service to the user over a network in response to determining that the user has been successfully authenticated,
send a request to a user computer system of the user requesting a first user ID of the user in response to receiving the first message, the first user ID being one of the plurality of user IDs,
receive the user ID in response to the request,
identify a first reference value of the plurality of reference values based on the received user ID and the plurality of associations,
cause an eID provider computer system to perform ID token-based authentication based on the identified first reference value, the eID provider computer system being different from the first computer system and the bridge computer system, the ID token-based authentication including comparing the identified first reference value with a data value received from an ID token associated with the user, and
send an identify confirmation message regarding the user to the first computer system in response to determining that the ID token-based authentication based on the identified first reference value was successful, the identity confirmation message causing the first computer system to determine that the user has been successfully authenticated.

5. The bridge computer system according to claim 4, wherein
the bridge computer system is connected with the eID provider computer system,
over the network, or
over an Intranet of a computing center with protected security technology, or
the eID provider computer system and the bridge computer system are both included in an individual data processing device.

6. A method performed by a bridge computer system to authenticate a user, the method comprising:
receiving a first message from a first computer system indicating an unsuccessful first authentication attempt by a user, the first computer system being configured to provide a first service to the user over a network in response to determining that the user has been successfully authenticated;
sending a request to a user computer system of the user requesting a user ID of the user in response to receiving the first message;
receiving the user ID in response to the request;
identifying an address of a second computer system stored in association with the received user ID, the second computer system being configured to provide a second service to the user over the network in response to determining that the user has been successfully authenticated, the second computer system being different from the first computer system and the bridge computer system;
causing the second computer system to second authenticate the user;
receiving an indication from the second computer system that the second authentication was successful; and
sending an identity confirmation message regarding the user to the first computer system in response to the receiving the indication, the identity confirmation message causing the first computer system to determine that the user has been successfully authenticated.

7. The method according to claim 6, further comprising: selecting the second computer system from among multiple stored computer systems that are associated with the received user ID in response to determining that the second computer system meets a condition, the condition being one of, having a lowest processor utilization, having a processor utilization below a threshold, having a highest security level, each respective computer system of the multiple stored computer systems being assigned a security level that indicates authentication requirements of the respective computer system, having a security level above a threshold, or having a highest priority according to a user-editable configuration file.

8. A method performed by a bridge computer system to authenticate a user, the method comprising:

receiving a first message from a first computer system indicating an unsuccessful first authentication attempt by a user, the first computer system being configured to provide a service to the user over a network in response to determining that the user has been successfully authenticated;

sending a request to a user computer system of the user requesting a user ID of the user in response to receiving the first message;

receiving the user ID in response to the request;

identifying a stored reference value based on the received user ID;

causing an eID provider computer system to perform ID token-based authentication based on the identified reference value, the eID provider computer system being different from the first computer system and the bridge computer system, the ID token-based authentication including comparing the identified reference value with a data value received from a first ID token associated with the user; and sending an identify confirmation message regarding the user to the first computer system in response to determining that the ID token-based authentication based on the identified reference value was successful, the identity confirmation message causing the first computer system to determine that the user has been successfully authenticated.

9. The method according to claim 8, wherein the ID token-based authentication comprises:

first authenticating the user with respect to the first ID token;

second authenticating the eID provider computer system with respect to the first ID token;

calculating the data value using the first ID token when both the first authenticating and the second authenticating are successful;

transferring, via the first ID token, the data value to the eID provider computer system;

transferring, by the eID provider computer system, the data value to the bridge computer system;

determining, by the bridge computer system, whether the stored reference value matches the data value transferred from the eID provider computer system; and determining that the ID token-based authentication of the user is successful when the stored reference value is determined to match the data value.

10. The method according to claim 9, wherein the calculating the data value comprises:

receiving, via the first ID token, an authorization certificate associated with the bridge computer system, the authorization certificate containing a public key of the bridge computer system; and deriving the data value from the public key of the bridge computer system using a derivation function and a private key of the first ID token, the data value being specific for the bridge computer system and the user associated with the first ID token.

11. The method according to claim 10, further comprising:

signing, by the eID provider computer system, the data value using a private key of the eID provider computer system before the sending the data value to the bridge computer system, the sending the data value to the bridge computer system sending the data value in signed form; and determining that the ID token-based authentication of the user is successful only once the bridge computer system has validated the signing using the data value in signed form.

12. The method according to claim 9, wherein the second authenticating includes:

transferring, by the eID provider computer system to the first ID token, a certificate indicating one or more attributes previously provided by the first ID token, the eID provider computer system having read or receive permission for the first ID token, the data value representing an attribute value of the one or more attributes; and determining, by the first ID token, whether the eID provider computer system has permission to receive the data value based on the certificate before the calculating the data value.

13. The method according to claim 12, wherein the first ID token is configured to set up, through the user computer system, a connection between the first ID token and the eID provider computer system using end-to-end encryption, the certificate or the data value being transferred over the connection.

14. The method according to claim 6, further comprising: establishing a second communications link between the user computer system and the bridge computer system after receiving the first message, wherein the first authentication attempt is performed in response to an authentication request transferred over a first communications link between the user computer system and the first computer system, the first communications link is terminated after the unsuccessful first authentication attempt, the causing includes establishing a third communications link between the user computer system and the second computer system to initiate execution of the second authentication, and the sending the identity confirmation message includes re-establishing the first communications link.

15. The method according to claim 14, wherein:

the establishing the second communications link is based on forwarding the user computer system to an address of the bridge computer system;

establishing the third communications link is based on forwarding the user computer system to the identified address of the second computer system; and re-establishing the first communications link is based on forwarding the user computer system to an address of the first computer system.

16. The method according to claim 15, wherein the second communication link and the third communication link are established based on a session ID used during the unsuccessful first authentication attempt, one or more parameter values associated with the session ID being stored.

17. A method performed by a first computer system to authenticate a user, the method comprising:
receiving an authentication request from a user computer system associated with a user over a network;
attempting authentication of the user;
sending a message to a bridge computer system in response to determining that the attempting the authentication was unsuccessful, the message indicating that authentication of the user was unsuccessful and including an address of a user computer system different from the first computer system and the bridge computers system, the first computer system and the bridge computer system being operated by different persons or organizations, implementation of the attempting the authentication of the user being exclusively controlled by an operator of the first computer system;
receiving an identity confirmation message regarding the user from the bridge computer system in response to the message;
determining the user has been successfully authenticated in response to the receiving the identity confirmation message; and
providing a service to the user over the network in response to the determining.

18. The method according to claim 8, further comprising:
establishing a second communications link between the user computer system and the bridge computer system after receiving the first message,
wherein
the first authentication attempt is performed in response to an authentication request transferred over a first communications link between the user computer system and the first computer system,
the first communications link is terminated after the unsuccessful first authentication attempt,
the causing includes establishing a third communications link between the user computer system and the eID provider computer system to initiate execution of the ID token-based authentication, and
the sending the identity confirmation message includes re-establishing the first communications link.

19. The method according to claim 18, wherein:
the establishing the second communications link is based on forwarding the user computer system to an address of the bridge computer system;
establishing the third communications link between the user computer system and the eID provider computer system is based on forwarding the user computer system to an address of the eID provider computer system; and
re-establishing the first communications link is based on forwarding the user computer system to an address of the first computer system.

* * * * *